(12) United States Patent
Möller

(10) Patent No.: US 8,820,519 B2
(45) Date of Patent: Sep. 2, 2014

(54) EGG BELT

(71) Applicant: Big Dutchman International GmbH, Vechta (DE)

(72) Inventor: Günter Möller, Essen (DE)

(73) Assignee: Big Dutchman International GmbH, Vechta (DE)

( * ) Notice: Subject to any disclaimer, the term of this patent is extended or adjusted under 35 U.S.C. 154(b) by 0 days.

(21) Appl. No.: 13/875,631

(22) Filed: May 2, 2013

(65) Prior Publication Data

US 2013/0299317 A1 Nov. 14, 2013

(30) Foreign Application Priority Data

May 3, 2012 (DE) .................... 20 2012 004 330 U

(51) Int. Cl.
*B65G 17/34* (2006.01)
*B65G 15/58* (2006.01)
*A01K 31/16* (2006.01)

(52) U.S. Cl.
CPC .............. *B65G 15/58* (2013.01); *A01K 31/165* (2013.01); *B65G 2201/0208* (2013.01)
USPC ................. 198/803.15; 198/867.12; 209/513; 53/534

(58) Field of Classification Search
CPC ..................... B65G 17/46; B65G 2812/02495; B65G 2812/02762; B65G 2812/02534; B65G 2201/0208; A01K 43/06; A01K 43/04; B65B 23/02

USPC ........ 198/867.12, 803.14; 209/510, 513, 681, 209/912; 53/534, 543, 536
See application file for complete search history.

(56) References Cited

U.S. PATENT DOCUMENTS

| | | | | |
|---|---|---|---|---|
| 2,074,383 | A * | 3/1937 | Funk | 198/803.14 |
| 2,149,686 | A * | 3/1939 | Rivenburgh | 209/510 |
| 3,898,435 | A * | 8/1975 | Pritchard et al. | 209/513 |
| 4,575,993 | A * | 3/1986 | Meyn | 53/534 |
| 5,232,080 | A * | 8/1993 | van Essen et al. | 198/418.6 |
| 5,365,717 | A * | 11/1994 | McKinlay | 53/534 |
| 6,625,960 | B1 * | 9/2003 | Nambu | 53/502 |

FOREIGN PATENT DOCUMENTS

| | | |
|---|---|---|
| DE | 525996 | 6/1931 |
| DE | 18020785 | 8/1960 |
| DE | 7102326 | 1/1971 |

OTHER PUBLICATIONS

German Search Report issued in priority document DE 20 2012 004 330.7, dated Mar. 6, 2013.

* cited by examiner

*Primary Examiner* — James R Bidwell
(74) *Attorney, Agent, or Firm* — Price Heneveld LLP

(57) ABSTRACT

A egg belt comprises a belt extending in a conveying direction for conveying eggs in the conveying direction. The belt is provided with a plurality of openings, each being triangular in shape.

20 Claims, 7 Drawing Sheets

PRIOR ART

EGG BELT

CROSS-REFERENCE TO FOREIGN PRIORITY APPLICATION

The present application claims the benefit under 35 U.S.C. §119(b) of German Application No. 20 2012 004 330.7, filed May 3, 2012, entitled "Egg Belt."

FIELD OF THE INVENTION

The invention relates to an egg belt, comprising a belt extending in a conveying direction for conveying eggs in a conveying direction and having a plurality of openings.

Egg belts are used in the field of egg production for transporting eggs in a conveying direction, for example when transporting eggs from laying hen cages to packing stations. In many cases, egg belts are endless belts having a main direction of extension that is identical to the conveying direction. Parallel to the main direction of extension or conveying direction, an egg belt is bounded by two edges or borders, and likewise by two edges or borders running transversely to the main direction of extension or conveying direction. Egg belts can be used in various conveying systems and may be driven by various means in order to transport eggs in the conveying direction.

In addition to the eggs themselves, it is also possible that fecal residues, feathers or other kinds of dirt or contamination such as dust can land on the belt, where they accumulate and are transferred to the eggs, with the result that the eggs are also dirtied.

Besides desired movement of the eggs along with the egg belt in a conveying direction, there is often movement of the eggs relative to the belt as well, in particular backward and forward rolling movement, i.e. in the conveying direction or the opposite direction, or lateral movement, or combinations thereof. Such movements of the eggs relative to the belt can result in damage to the eggs and to greater transfer of dust and dirt from the belt to the eggs and for that reason are undesirable.

Existing egg belts are provided with a plurality of openings, through which dirt is meant to fall and by means of which rolling movements of the eggs are meant to be reduced. A portion of a prior art egg belt comprising a plurality of circular openings is shown in FIG. 1. Egg belts with square openings are also known from the prior art.

An object of the present invention is to provide an improved egg belt, in particular an egg belt on which the eggs are dirtied to a lesser extent.

SUMMARY OF THE INVENTION

This object is achieved by an egg belt of the kind initially specified, which is characterized in that the openings are triangular in shape.

The triangular design of the openings according to the present invention has several advantages compared to the egg belt openings known from the prior art.

A first advantage is that, by configuring the egg belt with triangular openings or holes in accordance with the invention, an egg dips into such a triangular opening with a portion of its surface and is supported by the belt at three points, that is to say at one point per side of the triangle. This three-point support for the eggs on the egg belt is significantly more stable than the support provided by circular, square or rectangular openings. In this way, relative movement between the eggs and the belt can be further reduced with the egg belt according to the invention.

Compared to round openings, in particular, the triangular openings according to the invention have the further advantage that ring-shaped dirt marks on the eggs can be prevented. Such ring-shaped dirt marks are particularly conspicuous and therefore disadvantageous. Due to the triangular shape of the openings, an egg is preferably in contact with the egg belt at three points only, regardless of the orientation of the egg, i.e., there is one point of contact with the egg per side of a triangular opening. In this way, only punctiform dirt marks arise, instead of circular dirt marks.

In comparison with prior art egg belts with square openings, the embodiment with triangular openings has the further advantage that the egg belt has greater stability, in particular when the egg belt is subjected to tensile loads acting in the conveying direction and shear stress acting in the plane of the conveyor belt, which occurs in directions non-parallel to the conveying direction, but rather at an angle thereto, when tensile forces apply. One effect that can arise in the case of belts with square or rectangular openings or holes is that the squares or rectangles are deformed into parallelograms and that the structure of the egg belt provides little resistance against such deformation. When the openings are embodied in the shape of triangles in accordance with the invention, there is significantly greater stability with respect to tensile forces and shear stress.

With the egg belt according to the invention, dirtying of the eggs can thus be significantly reduced, as there are only a minimal number of contact points between the egg and the egg belt using the three-point support according to the invention, compared to a ring-shaped or at least four-point support for the egg, thus reducing the amount of dirt, compared to existing egg belts, that is transferred via the contact points from the egg belt to the egg. The egg belt according to the invention also has greater stability with respect to tensile forces and shear stress.

More specifically, it is also possible with egg belts according to the invention to achieve a greater proportion of holes per section of belt, i.e., a minimized surface area, compared to an embodiment with round openings, so that dirt or dust can only accumulate on the remaining or minimized surface area, with less dirt in total being found on an egg belt according to the invention. This further helps to reduce dirtying of the eggs.

The openings or holes in the belt are preferably arranged in a regular pattern. This allows the stability of the belt to be further enhanced.

It is also preferred that the openings are in the shape of isosceles triangles. This development of the invention likewise has the advantage of making the egg belt very stable and of improving the support provided for the eggs compared to prior art egg belts.

More specifically, the triangular openings may have rounded corners. This has the advantage that less dirt can collect in the corners of the triangles and that dirtying of the eggs can be further reduced.

In one particularly preferred embodiment, the triangular openings each circumscribe a circle having a diameter of between 15 and 25 mm, in particular 20 mm.

When the triangles are provided in this form, the eggs can be made to sink into the openings to a depth similar to that in prior art egg belts with circular openings, i.e., the egg drops through the belt to a similar depth to that in conventional egg belts. At the same time, however, a triangular opening which circumscribes a circle having a particular diameter is larger than the respective circular opening having the same diameter. Due to this larger triangular opening, it is also possible for more dirt to fall through the belt than through the smaller circular openings. In this way, the amount of surface can be further reduced in comparison to prior art belts, such that less dirt and dust can accumulate on the egg belt, and dirtying of the eggs is reduced, while simultaneously ensuring that eggs do not hang too low through the belt.

In the preferred embodiment, the size of the triangles is selected such that an egg, regardless of its orientation, comes into contact with the egg belt at three points only, in particular at one point on each side wall of a triangle. Independence from the orientation of the egg results from the fact that the egg comes to lie in or on a opening, with its upper or lower end, the "poles", or also with its "equator", where its circumference is greatest, in such a way that three points of contact ensue between the egg and the egg belt.

In another embodiment, it is preferred that one side of each opening is aligned parallel to the conveying direction, the other two respective sides of the opening preferably being oriented at an angle of 60° and 120° to the conveying direction.

It is also preferred that the triangular openings are arranged in two or more rows extending in the conveying direction. This gives rise to a particularly advantageous, uniform arrangement of the triangles, with which it is easy to produce egg belts of different widths, in particular. It is specifically preferred in this regard that an egg belt has a width equal to a multiple of the width of such a row, in addition to one or two border widths at the edges of the egg belt extending in the conveying direction.

It is preferred that the triangular openings in a row are alternately rotated by 60°. In this way, the right- and left-hand sides of the triangles in a row, viewed in the conveying direction, are aligned preferably alternately parallel to the conveying direction. This orientation likewise has a positive effect on the stability of the egg belt.

It is also preferred that the rows are spaced apart from each other by webs extending in the conveying direction, said webs preferably having a width of less than 10 millimeters, in particular a width of 5 millimeters.

Such webs between the rows of openings allow an egg belt to be divided easily by making a cut in the conveying direction, for example in the middle of such a web, in order to obtain egg belts having different widths or to reduce the width of an egg belt. If an egg belt is not meant to be divided or cut, the webs are preferably very narrow, for example 5 millimeters in width, in order to minimize the surface of the egg belt on which dust and dirt can collect.

It is further preferred that the triangular openings, in particular the triangular openings in a row, are separated from each other by webs which are oriented at an angle of 60° or 120° to the conveying direction, said webs preferably having a width of less than 10 millimeters, in particular a width of 5 millimeters.

Webs are preferably provided between the triangular openings as well, in particular within a row. These webs are also preferably narrow, for example with a width of 5 millimeters, in order to keep the surface of the egg belt minimized and thus to reduce the possibility of dirtying. It is preferred, particularly in combination with one of the aforesaid orientations of the openings, that the webs are at an angle of 60° or 120° to the conveying direction. Varying the orientation of the triangles thus produces a grid of webs that is preferably formed by webs running in the conveying direction between the rows of openings, and by webs arranged alternately at angles of 60° and 120° to the conveying direction within the rows. Such a preferred grid of webs results in the egg belt having a particularly high level of stability with respect to tensile forces or shear stress.

The egg belt preferably has one or more areas without openings. This should be understood to mean that, in addition to the webs separating individual openings from each other, there are also larger regions of the belt which do not have openings.

It is preferred for example, that a middle, strip-shaped area extending in the conveying direction is formed without openings, said middle area preferably having a width equal to the width of one, two or several rows of openings.

In the specific case of egg belts having a large width, in particular with three or more rows of openings, such an area without openings is preferred in order to increase the stability of the egg belt still further. Such a strip without openings may also be used to divide the egg belt in the conveying direction. From the production engineering perspective, forming the strip with a width of one, two or more rows of openings is advantageous because these rows can be simply produced without openings, whereas the width of the egg belts is substantially the same regardless of whether middle rows with or without openings are produced.

It is also preferred that one or both of the belt borders extending in the conveying direction is/are formed without openings.

Forming a continuous border at an egg belt edge extending in the conveying direction is preferred, for example, in order to attach or to drive the belt. A particularly preferred embodiment is one in which such a border is formed at both egg belt edges extending in the conveying direction.

However, it is preferred in this regard, in particular, that the edge(s) without openings has/have a width which is less than the length of one side of a triangular opening.

It is particularly preferred that the edge(s) without openings has/have a width which is less than the width of a strip of openings, in particular less than half of the width of such a strip. It is further preferred that the edge(s) without openings has/have a width which is less than half of the length of one side of a triangular opening. It is particularly preferred that the width of the edge(s) is less than 15 mm, with a width of 10 mm being particularly preferred.

In one particularly preferred embodiment, an egg belt may be produced by arranging the row with triangular openings so far to the left and right of a middle line extending in the conveying direction that a border without openings and with a specific width, in particular with a width of 10 millimeters, is formed on the right and on the left. A middle, strip-shaped area without openings and extending in the conveying direction may result, the width of which is the total width of the egg belt minus the width of the two borders and minus the total width of the rows with openings provided on the right and on the left.

The advantage of making the border area(s) so narrow is that an egg rolling onto the egg belt transversely to the conveying direction, for example from a cage, will quickly reach one of the triangular openings and as a result will come into contact with the egg belt across the minimized width of the border area. Less contact with the egg belt advantageously results in less dirtying of the eggs.

Another advantage of a narrow border area is that dirt and contamination landing on the egg belt from the cages, for example, such as feces or feathers, is/are quickly fed to the triangular openings and can fall through said openings so that less dirt remains on the egg belt, on the whole.

It is also preferred that at least one end of the belt has an edge which is oriented at an angle of 60° or 120° to the conveying direction.

Egg belts are generally separated by a cut made transversely or orthogonally to the conveying direction. In combination with any one of the aforementioned orientations for the triangular openings, in particular, it is preferred that one or both ends of the belt is not at an angle of 90° to the conveying direction, but at an angle of 60° or 120° to the conveying direction. In this way, it is possible for said edges to run between the openings, in sections at least, in the region of the webs which are preferably oriented at an angle of 60° or 120° to the conveying direction. This makes it easier to handle the ends of the egg belt, due to them being compacter as a result.

It is particularly preferred that the egg belt comprises or consists of plastic, preferably a thermoplastic, in particular polypropylene, and/or is produced by an extrusion process.

The egg belt is preferably made from a flexible material. A particularly preferred embodiment is one in which the thickness of the egg belt is less than two millimeters, in particular 1.3 millimeters or less. Due to the inventive configuration of the openings as triangles, and where relevant by further developing the egg belts, the stability of the egg belt is increased so that less thickness is required, thus allowing material and weight to be saved.

DETAILED DESCRIPTION OF THE PREFERRED EMBODIMENTS

Figure 1:
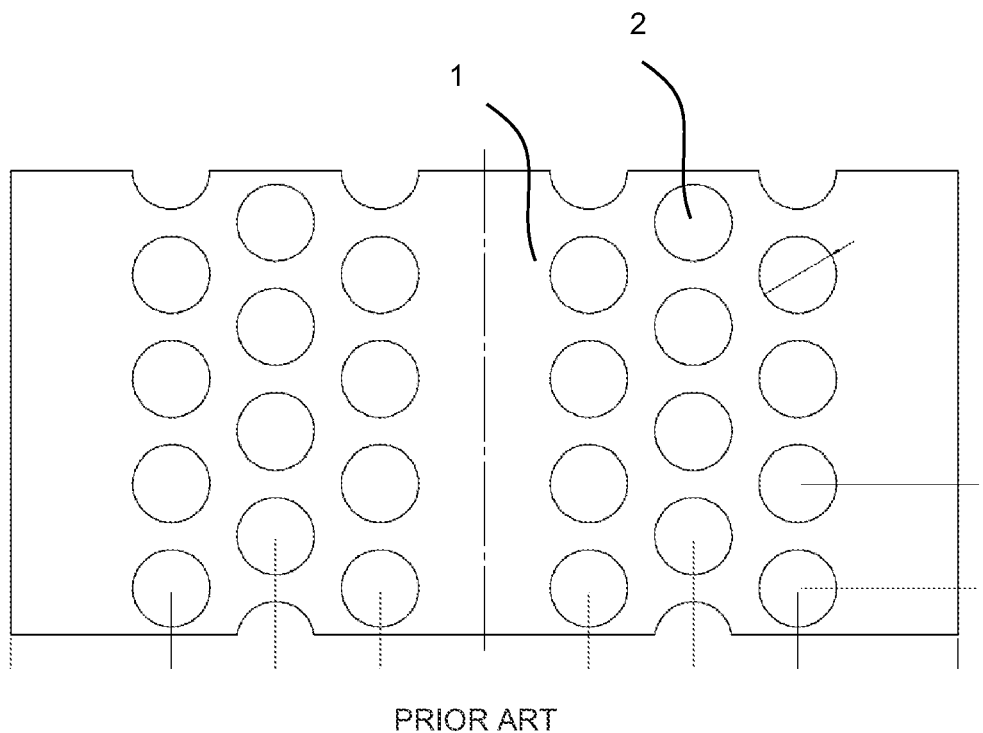
FIG. 1: shows a prior art egg belt having circular openings.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 shows a prior art egg belt 1 having circular openings 2.

Preferred embodiments of the invention shall now be described by way of example with reference to FIGS. 2 to 5, which show embodiments of egg belts 10 according to the invention, with different widths B and having different middle strips M without openings. Egg belts 10 have openings 20 which are arranged in rows 30 extending in the conveying direction F. Openings 20 in a row 30 are arranged in such a way that, in any row, there are triangles alternately rotated by 60°, so that right- and left-hand sides of triangles 20 in conveying direction F are alternately aligned parallel to the conveying direction. The openings 20 are isosceles triangles and have rounded corners with a radius RA (FIG. 7).

Figure 5:
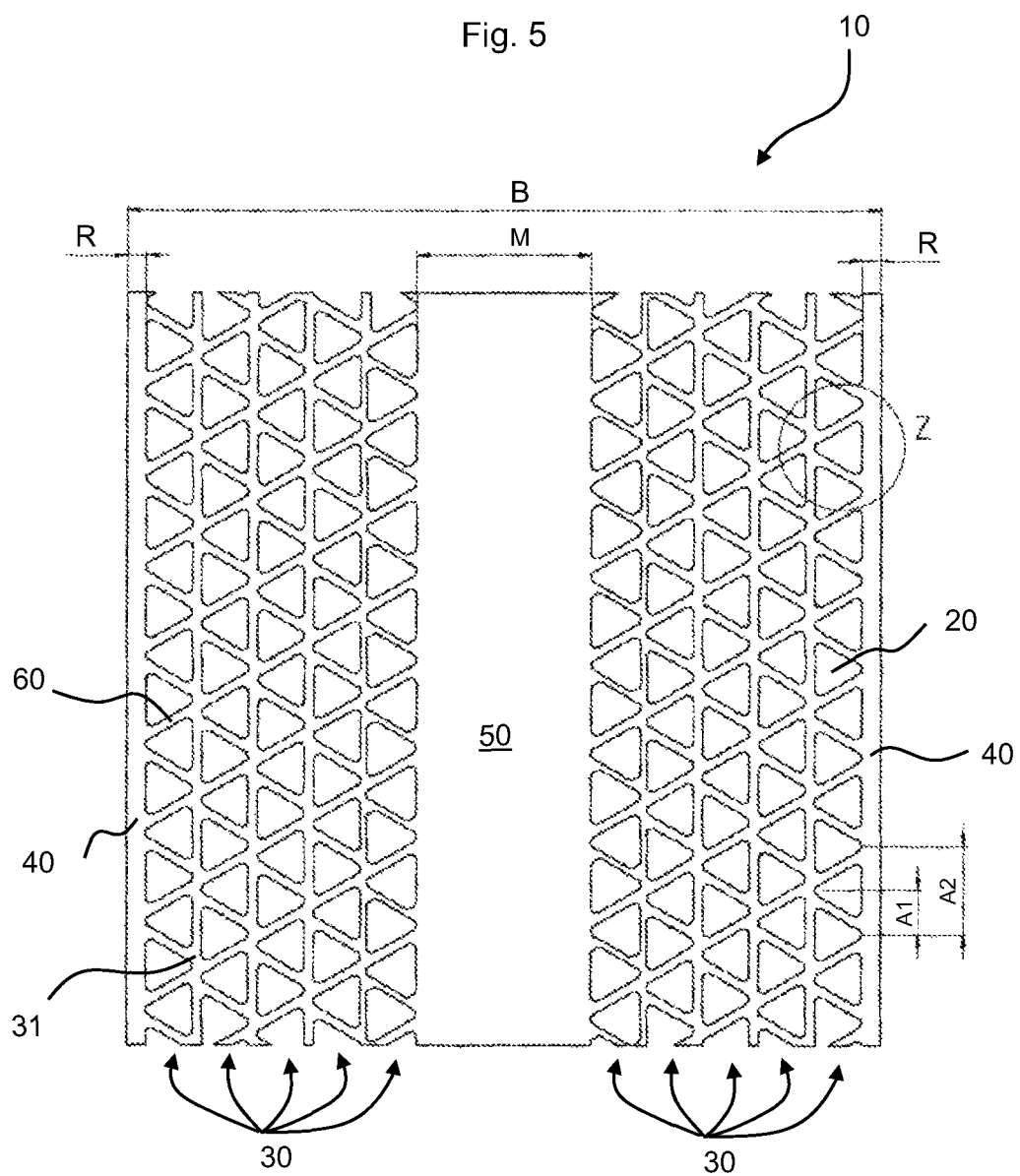
FIG. 5: shows a fourth embodiment of an egg belt according to the invention.
Figure 6:
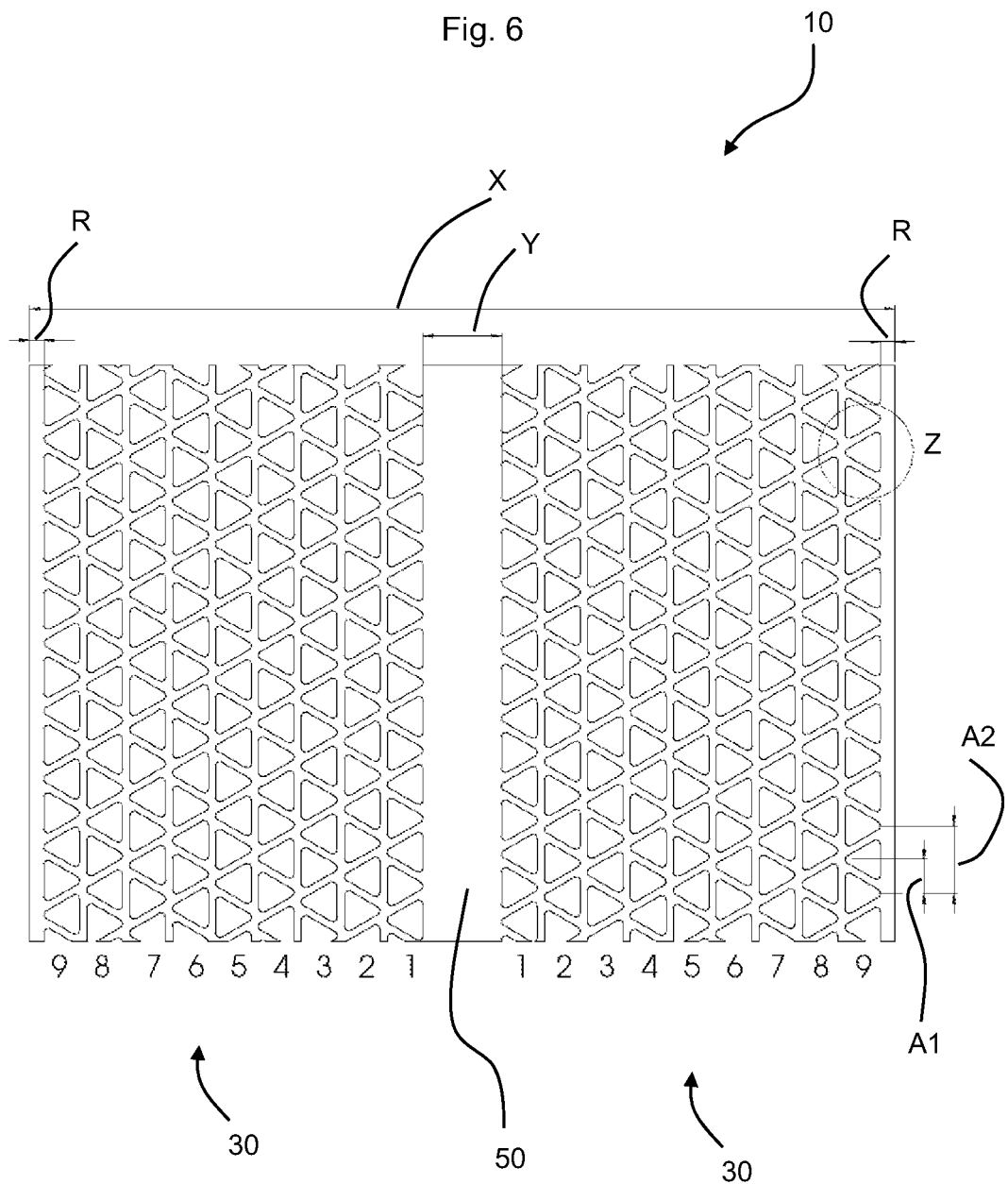
FIG. 6: shows a structural scheme for specific embodiments of egg belts according to the invention.
Figure 7:
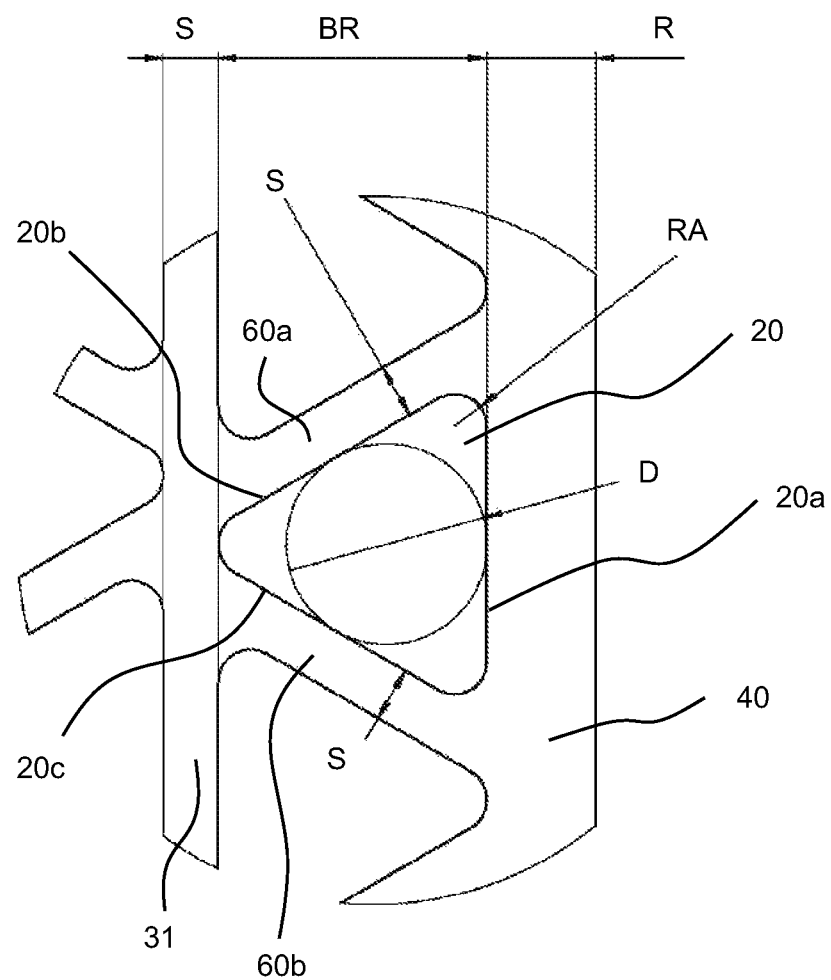
FIG. 7: shows a detail Z from FIGS. 2 to 6.

As can be seen from FIG. 7, in particular, the triangular openings 20 each circumscribe a circle having a diameter D, which is 18.5 mm in the embodiments shown in FIGS. 2 to 6. Openings 20 are arranged in such a way that one side 20a of each opening is aligned parallel to the conveying direction F, another side 20b is oriented at an angle of 60° to the conveying direction F, and the third side 20c is oriented at an angle of 120° to the conveying direction.

Rows 30 are spaced apart from each other by webs 31 extending in the conveying direction F, triangular openings 20 being likewise separated from each other by webs 60. Webs 60a oriented at an angle of 60° to conveying direction F and webs 60b oriented at an angle of 120° to conveying direction F run alternately from webs 60 between the openings 20 in a row 30. Webs 31, 60 preferably have a width S of 5 mm.

Both of the belt borders 40 extending in the conveying direction are without openings. Borders 40 have a width R of 10 mm. The width BR of a row 30 is preferably 24.75 millimeters.

Belts 10 in FIGS. 2 to 6 respectively have a middle, strip-shaped area 50 without openings, extending in conveying direction F.

Figure 2:
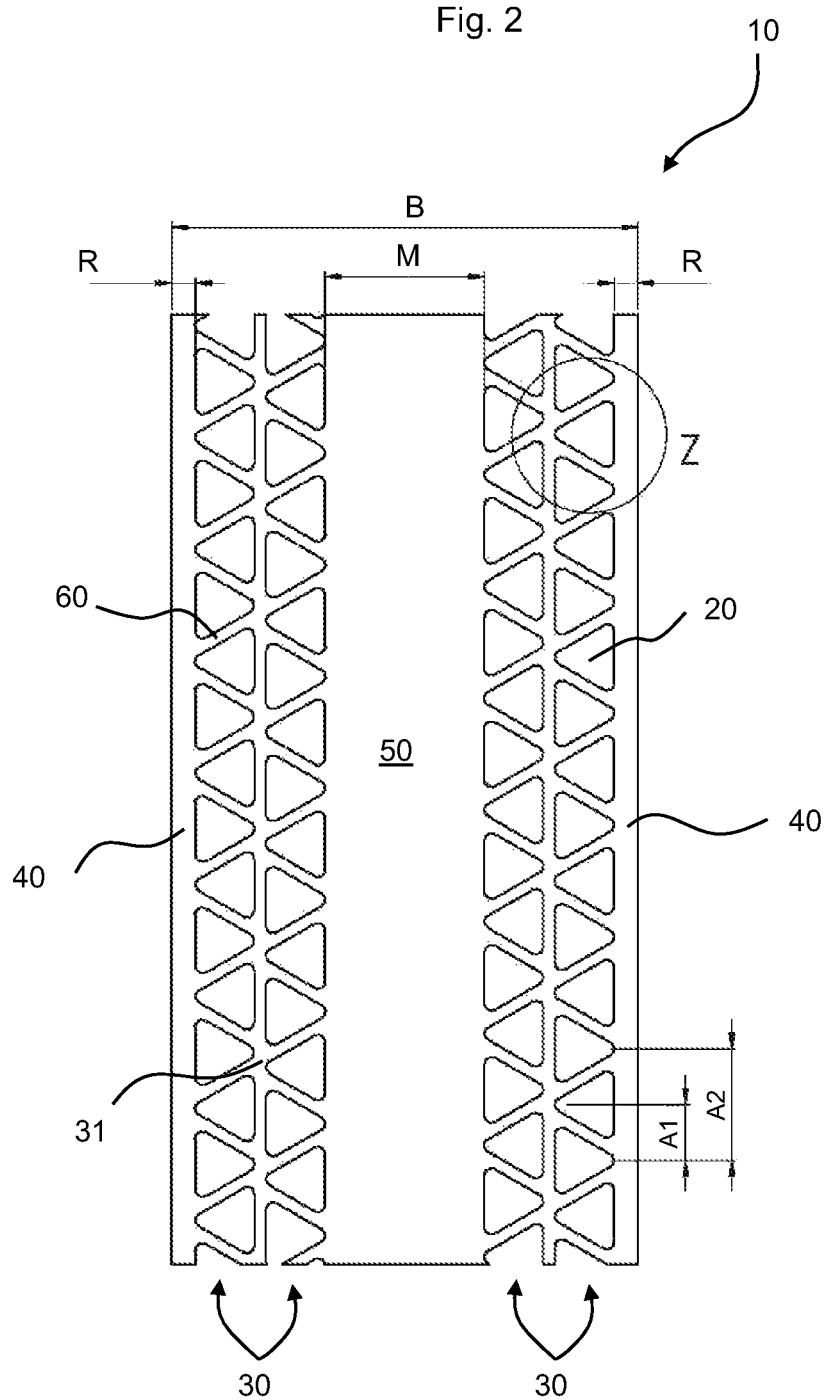
FIG. 2: shows a first embodiment of an egg belt according to the invention.
Figure 3:
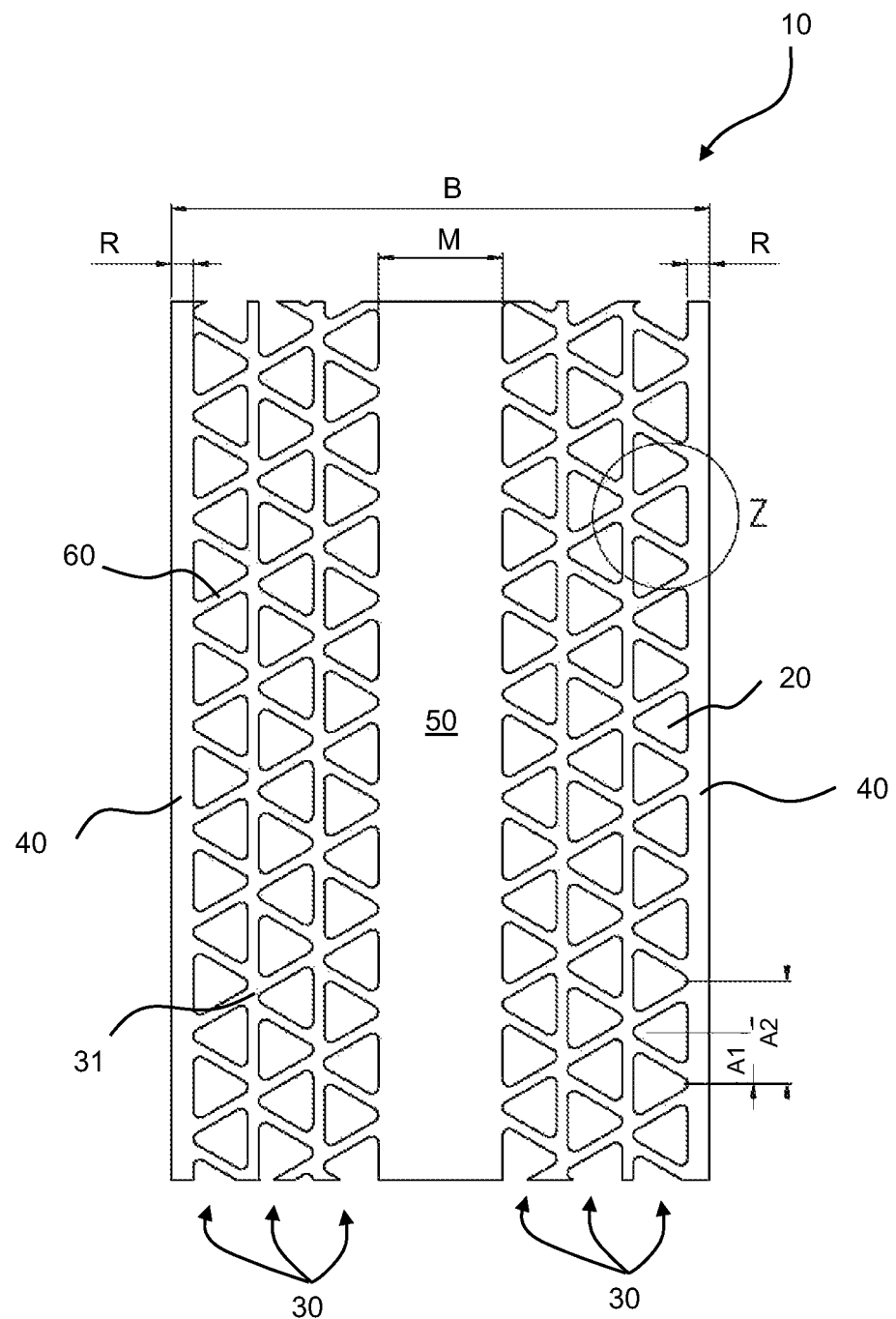
FIG. 3: shows a second embodiment of an egg belt according to the invention.
Figure 4:
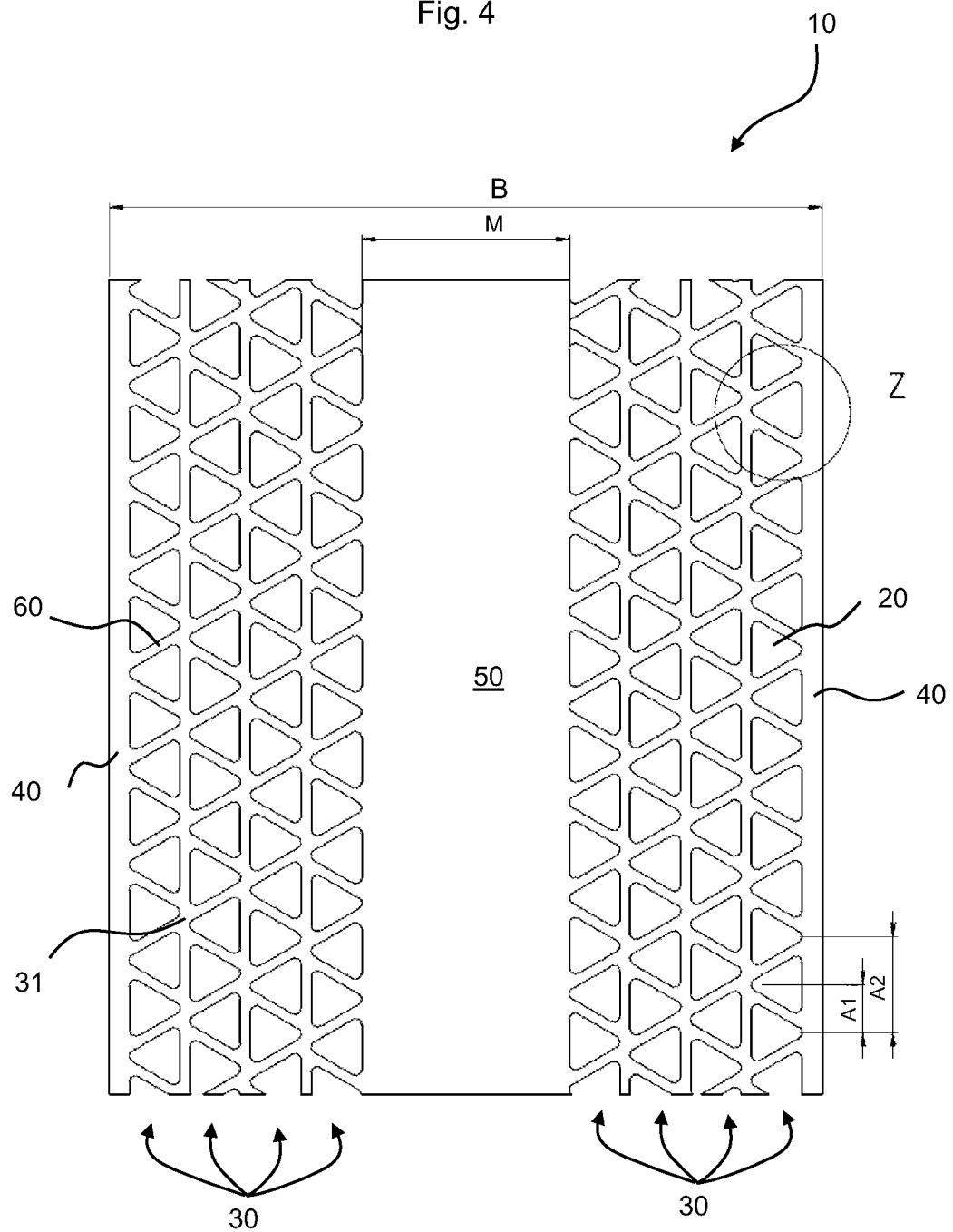
FIG. 4: shows a third embodiment of an egg belt according to the invention.

The total widths B of belt 10, the number of rows 30 of openings 20 and the width of the middle strip M of egg belts 10 vary as follow in the examples shown in FIGS. 2 to 5:

FIG. 2: Twice two rows 30, B=196 mm, M=67 mm,

FIG. 3: Twice three rows 30, B=245 mm, M=56.50 mm,

FIG. 4: Twice four rows 30, B=350 mm, M=102 mm,

FIG. 5: Twice five rows 30, B=400 mm, M=92.50 mm.

In all the embodiments shown, the distance A1 is preferably 23.53 millimeters and distance A2 is preferably 47.05 millimeters.

FIG. 6 shows a structural scheme which the specific layouts of the egg belts shown in FIGS. 2 to 5, as well as other egg belt widths can be determined.

The following table specifies the nominal width of the egg belts, corresponding to the X value. The Y dimension is the width of the respective middle strip M. The details relate to openings 20 circumscribing a circle of 18.5 mm diameter. For the various nominal widths of the egg belts, the table specifies which of the left-hand and right-hand rows 30, numbered 1 to 9, remain unperforated in order to produce the respective egg belts. In the column headed "Description", the table also specifies how many rows 30 of triangular holes the respective egg belt with the relevant nominal width comprises.

| Description | X dimension | Y dimension | Unperforated left | Unperforated right |
|---|---|---|---|---|
| Egg belt, 600 mm; 14 triangular holes, Ø 18.5 mm | 600 mm | 54.5 mm | 4, 5 | 4, 5 |
| Egg belt, 500 mm; 12 triangular holes, Ø 1.8 mm | 500 mm | 73.5 mm | 3, 8, 9 | 3, 8, 9 |
| Egg belt, 400 mm; 10 triangular holes, Ø 18.5 mm | 400 mm | 92.5 mm | 6, 7, 8, 9 | 6, 7, 8, 9 |
| Egg belt, 350 mm; 8 triangular holes, Ø 18.5 mm | 350 mm | 102 mm | 5, 6, 7, 8, 9 | 5, 6, 7, 8, 9 |
| Egg belt, 245 mm; 6 triangular | 245 mm | 56.5 mm | 4, 5, 6, 7, 8, 9 | 4, 5, 6, 7, 8, 9 |

-continued

| Description | X dimension | Y dimension | Unperforated left | Unperforated right |
|---|---|---|---|---|
| holes, Ø 18.5 mm Egg belt, 196 mm; 4 triangular holes, Ø 18.5 mm | 196 mm | 67 mm | 3, 4, 5, 6, 7, 8, 9 | 3, 4, 5, 6, 7, 8, 9 |

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. An egg belt, comprising a belt extending in a conveying direction for conveying eggs in the conveying direction and having a plurality of openings therethrough, wherein the openings are triangular in shape.

2. The egg belt of claim 1, wherein the openings are in the shape of isosceles triangles.

3. The egg belt of claim 1, wherein the openings have rounded corners.

4. The egg belt of claim 1, wherein the openings each circumscribe a circle having a diameter of between 15 and 25 millimeters.

5. The egg belt of claim 4, wherein the openings each circumscribe a circle having a chamber of 20 millimeters.

6. The egg belt of claim 1, wherein the openings are arranged such that a first side of each opening is aligned parallel to the conveying direction, the other two respective sides oriented at an angle of 60° and 120°, respectively, to the conveying direction.

7. The egg belt of claim 1, wherein the openings are arranged in two or more rows extending in the conveying direction.

8. The egg belt of claim 7, wherein the openings in one of the two or more rows are alternately rotated by 60°.

9. The egg belt of claim 7, wherein the rows are spaced apart from each other by webs extending in the conveying direction, the webs having a width of less than 10 millimeters.

10. The egg belt of claim 9, wherein the webs have a width of less than 5 millimeters.

11. The egg belt of claim 1, wherein the belt has one or more areas without openings.

12. The egg belt of claim 11, wherein the belt is adapted to contain a plurality of rows of openings, the belt further comprising a middle, strip-shaped area extending in the conveying direction, the middle area being formed without openings and having a width equal to the width of one or more of the plurality of rows of openings.

13. The egg belt of claim 11, further comprising one or more belt borders extending in the conveying direction, wherein the one or more of the belt borders are formed without openings.

14. The egg belt of claim 13, characterized in that the one or more borders without openings have a width that is less than the length of one side of one of the plurality of triangular openings.

15. The egg belt of claim 14, wherein the width of the one or more borders without openings is 10 millimeters.

16. The egg belt of claim 1, wherein at least one end of the belt has an edge which is oriented at an angle of 60° or 120° to the conveying direction.

17. The egg belt of claim 1, wherein the egg belt is comprised of a plastic material produced by an extrusion process.

18. The egg belt of claim 17, wherein the plastic material is a thermoplastic.

19. The egg belt of claim 18, wherein the plastic material is polypropylene.

20. An egg belt comprising a belt extending in a conveying direction for conveying eggs in a conveying direction and having a plurality of triangular openings arranged in two or more rows extending in the conveying direction, wherein the triangular openings are separated from each other by webs which are oriented at an angle of 60° or 120° to the conveying direction, the webs preferably having a width of less than 10 millimeters.

* * * * *